(12) United States Patent
Nguyen et al.

(10) Patent No.: US 8,797,918 B1
(45) Date of Patent: Aug. 5, 2014

(54) METHOD AND APPARATUS FOR DISTRIBUTED TOPOLOGY FUNCTION IN SERIAL ATTACHED SMALL COMPUTER SYSTEM INTERFACE (SAS)

(75) Inventors: Truong Nguyen, Vancouver (CA); Heng Liao, Belcarra (CA)

(73) Assignee: PMC-Sierra, Inc., Santa Clara, CA (US)

( * ) Notice: Subject to any disclaimer, the term of this patent is extended or adjusted under 35 U.S.C. 154(b) by 1415 days.

(21) Appl. No.: 11/536,250

(22) Filed: Sep. 28, 2006

Related U.S. Application Data

(60) Provisional application No. 60/721,081, filed on Sep. 28, 2005.

(51) Int. Cl.
*H04L 12/28* (2006.01)
*G06F 13/14* (2006.01)

(52) U.S. Cl.
CPC ........ *G06F 13/14* (2013.01); *G06F 2213/0028* (2013.01)
USPC ........... 370/255; 370/254; 370/351; 370/389; 370/400; 709/220; 709/228; 709/229; 709/230; 709/238

(58) Field of Classification Search
None
See application file for complete search history.

(56) References Cited

U.S. PATENT DOCUMENTS

| | | | |
|---|---|---|---|
| 6,886,051 B2 | 4/2005 | Thiesfeld | |
| 7,644,168 B2 * | 1/2010 | Grieff et al. | 709/229 |
| 7,738,397 B2 * | 6/2010 | Clayton | 370/254 |
| 2003/0184902 A1 | 10/2003 | Thiesfeld | |
| 2005/0080881 A1 * | 4/2005 | Voorhees et al. | 709/220 |
| 2005/0185599 A1 * | 8/2005 | Clayton | 370/254 |

* cited by examiner

*Primary Examiner* — Faruk Hamza
*Assistant Examiner* — Aixa A Guadalupe-Cruz
(74) *Attorney, Agent, or Firm* — Borden Ladner Gervais LLP; Jeffrey W. Wong

(57) ABSTRACT

The present invention is directed at a method and apparatus for determining a distributed Serial Attached Small computer system interface (SAS) topology in a storage network system. Once a SAS storage network element, such as a SAS Expander, receives notification that a downstream SAS topology has changed, the SAS Expander queries all downstream SAS Expanders to update its route table.

33 Claims, 6 Drawing Sheets

METHOD AND APPARATUS FOR DISTRIBUTED TOPOLOGY FUNCTION IN SERIAL ATTACHED SMALL COMPUTER SYSTEM INTERFACE (SAS)

CROSS REFERENCE TO RELATED APPLICATIONS

This application claims the benefit of priority of U.S. Provisional Patent Application No. 60/721,081 filed Sep. 28, 2005, which is incorporated herein by reference.

FIELD OF THE INVENTION

The present invention relates generally to storage network systems. More particularly, the present invention relates to a method and apparatus for a distributed topology function in serial attached small computer system interface (SAS).

BACKGROUND OF THE INVENTION

A serial attached small computer system interface (SCSI), or SAS topology is typically formed by a plurality of SAS storage network elements which include initiator SAS devices, such as a host, a host bus adapter or a SAS Expander; target SAS devices such as SAS Expander devices and SAS end devices such as hard disk drives.

In most SAS topologies, multiple SAS Expanders are located within the topology. The SAS Expander facilitates communication between the various SAS storage network elements by providing the necessary switching and routing functions which are required. Communication, typically in the form of connection request, between a SAS Expander and another SAS storage network element is performed by one of three routing methods, namely direct routing, table routing and subtractive routing. Direct routing is used to forward connection requests between the SAS Expander and a SAS storage network element which are directly attached to each other; table routing is used to forward connection requests between the SAS Expander and other storage network elements in the SAS topology which are not directly attached to SAS Expander and subtractive routing is used to forward unresolved connection requests when direct or table routing fails.

For SAS Expanders which communicate with storage network elements via subtractive routing, the storage network elements are notionally considered as being upstream from the SAS Expander and storage network elements with which the SAS Expander communicates with via table routing are typically considered as being downstream from the SAS Expander. As the SAS standard does not support loops within its topology, it will be understood that there is only one logical pathway between a SAS Expander and a storage network element which may be tracked and stored within a route table in the SAS Expander.

SAS Expanders may be seen as being self-configuring whereby the Expander is required to configure its own route table or non-self-configuring whereby the Expander receives route table information from another source. When necessary, a self-configuring SAS Expander configures the route tables of other non-self configuring expanders.

As will be understood, the Expander route table needs to be updated and configured each time there is a change made to the SAS topology (e.g., the addition or removal of a storage network element). However, this configuration is only required for SAS Expanders using table routing. Direct routing does not require any configuration as the SAS Expander is directly attached to another SAS storage network element and does not need to retrieve the address of the SAS storage element. Subtractive routing only requires a selection of a subtractive port in order to communicate with a SAS storage network element.

In order to configure the route tables of SAS Expanders, a centralized topology discovery method is typically used. An external management application client residing in an initiator SAS device, such as a host can configure the route table of all SAS Expanders to provide a centralized topology discovery and configuration.

Use of the centralized topology discovery sourced from the external management application client is common, however, many problems are also associated with this method. In this method, the application client is required to traverse the entire SAS domain (topology) in order to update all of the route table of all the SAS Expanders which results in this method being costly in terms of Serial Management Protocol (SMP) transactions. Another problem is that in SAS domains with multiple SAS standard management application clients, large numbers of redundant SMP transactions are experienced as topology discovery operations are inefficiently duplicated. Furthermore, in a SAS domain with multiple SAS Expanders, the SMP transactions span the multiple SAS Expanders as the topology is traversed which may result in an increase of link contention between these storage network elements. Moreover, in some cases, the SAS Expanders have their route table overwritten by each internal and external management application client in a duplicative and possibly disruptive manner. Also, with respect to self-configuring Expanders in the SAS domain, since they are only concerned with SAS storage network elements which are deemed to be downstream, there is no need for its route table to include upstream information.

It is, therefore, desirable to provide a method and apparatus for a distributed topology function in a SAS system.

SUMMARY OF THE INVENTION

It is an object of the present invention to obviate or mitigate at least one disadvantage of previous topology functions in a SAS domain.

The present invention is directed at a method and apparatus for determining a distributed SAS topology in a storage network system. Such a method and apparatus can updated a SAS Expander route table after a change has been made to the topology downstream from the SAS Expander. Once a SAS Expander receives notification that a change in downstream topology has occurred, the SAS Expander performs a method to configure its route table to reflect the change. By having the SAS Expander configure its own route table in a distributed manner using route table information from other SAS Expanders, less SMP transactions are required to be executed in order for each SAS Expander in the storage network system to reflect the new topology. After updating its route table, a signal is transmitted to an upstream SAS Expanders to update their route table.

The distributed topology discovery method minimizes the number of SMP transactions as well as the number of multiple expander links which are required by these transactions. Furthermore, initiator SAS devices are not required to configure the Expander route tables of self-configuring expanders thereby further reducing the number of SMP transactions required to configure an Expander route table.

In a first aspect, the present invention provides, in a Serial Attached Small Computer System Interface (SAS) domain including a set of SAS storage network elements, a method of configuring an Expander route table of a SAS Expander in a distributed manner comprising the steps of determining a set of route table information from a set of SAS Expanders in a list of Expanders to query; updating route tables of intermediate non self-configuring (NSCFG) SAS Expanders; and configuring the Expander route table based on said set of route table information.

In a further embodiment, there is provided, in a Serial Attached Small Computer System Interface (SAS) domain including a set of SAS Expanders, a method of configuring an Expander route table of a subject SAS Expander in a distributed manner comprising the steps of receiving an indication of a topology change the SAS domain downstream from the subject SAS Expander; configuring a route table of the subject SAS Expander based on information retrieved from a predetermined set of downstream SAS Expanders; transmitting a signal to an upstream SAS Expander, upon completion of the route table configuration, indicating a topology change to the SAS domain downstream from the upstream SAS Expander; activating the upstream SAS Expander as the subject SAS Expander; and repeating the steps of receiving, configuring, transmitting and setting for each upstream SAS Expander until a root SAS Expander is encountered.

In a further aspect, the present invention provides a computer readable medium containing computer instructions which, when executed, perform, in a Serial Attached Small Computer System Interface (SAS) domain including a set of SAS storage network elements, a method of configuring an Expander route table of a SAS Expander in a distributed manner, comprising instructions for determining a set of route table information from a list of Expanders to query; instructions for updating route tables of intermediate non self-configuring (NSCFG) SAS Expanders; and instructions for configuring the Expander route table based on said set of route table information.

In yet a further aspect, there is provided apparatus for determining a distributed Serial Attached Small computer system interface (SAS) topology for a SAS Expander comprising at least one PHY, each PHY including a transmitter for requesting route table information from a list of Expanders to query downstream from the SAS Expander and a receiver for receiving route table information as a result of the requests; and a processor for determining a set of route table information from a set of SAS Expanders in a list of Expanders to query; updating route tables of intermediate non self-configuring (NSCFG) SAS Expanders and retrieving a second set of route table information based on the step of updating; and configuring the Expander route table based on said set of route table information.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for a distributed topology function in a Serial Attached Small Computer System Interface (SAS) system.

Figure 1:
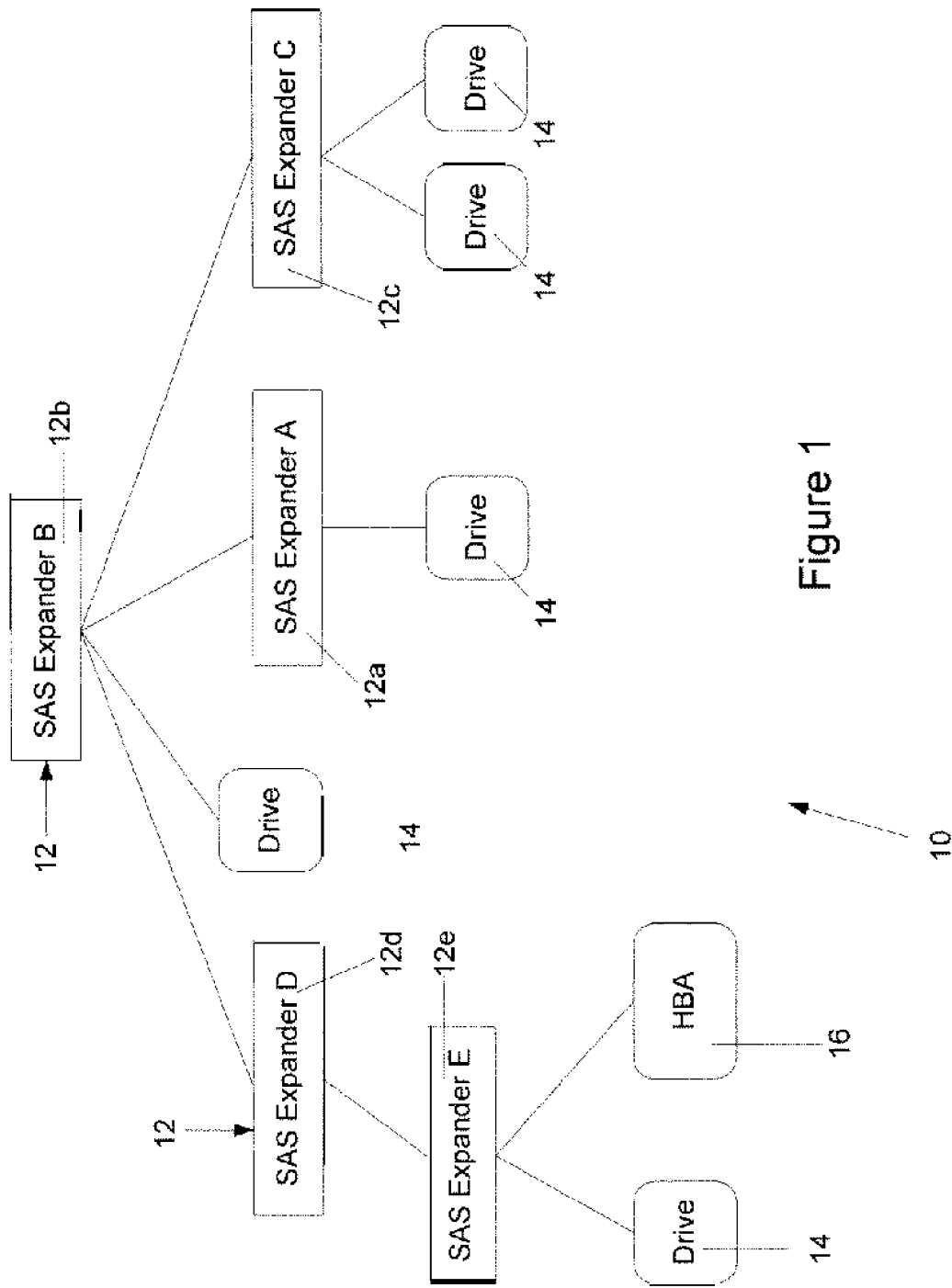
FIG. 1 is a schematic diagram of a SAS topology in a tree format.

Turning to FIG. 1, a schematic diagram of a SAS topology in a tree format is shown. The SAS topology 10 comprises a plurality of storage network elements such as a set of SAS Expanders 12, labeled as Expander A 12*a*, Expander B 12*b*, Expander C 12*c*, Expander D 12*d* and Expander E 12*e* along with a set of drives 14 and a host bus adapter (HBA) 16. The method of the invention is performed by each of the SAS Expanders in the SAS topology once it receives an indication that a change in the downstream topology has occurred. In order to simplify the discussion, the term subject SAS Expander will be used to describe the SAS Expander currently performing the method of distributed topology determination. It will be understood that the SAS topology 10 may include any number of different SAS components and that the topology shown in FIG. 1 is for example purposes only.

Typically, in SAS standards, a SAS storage network element with a subtractive port connected to a SAS storage network element with a table routing port acting as a child to the SAS storage network element with the table routing port. Moreover, when a direct routing port of a SAS storage network element is connected to a table routing port of a SAS storage network element, the SAS storage network element with the direct routing port is seen as the child.

Each of the storage network elements includes at least one PHY which is a Physical Interface that communicates with a PHY in another storage network element. A physical link connects a PHY within one storage network element with a PHY in another storage network element. Each PHY includes a transmitter for transmitting data and a receiver for receiving data. More specifically, each SAS Expander includes a PHY having a transmitter for transmitting queries to downstream SAS Expanders and a receiver for receiving route table information from the downstream SAS Expanders. The receiver also receives an initiator signal indicating to the SAS Expander that a downstream topology has changed. The SAS Expander further comprises a processor for configuring the route table of the Expander after receiving all of the route table information.

Communication between the PHYs is typically accomplished via one of three routing mechanisms, namely direct routing, table routing or subtractive routing. Direct routing is used to forward connection requests between SAS Expanders which are directly connected to each other, such as between SAS Expander B 12*b* and SAS Expander D 12*d*. Table routing is used to forward connection requests from a SAS Expander to another SAS Expander which is not directly connected such as between SAS Expander B 12*b* and SAS Expander E 12*e*. Subtractive routing is used to forward unresolved connection requests when neither direct nor table routing is successful.

The route tables of SAS Expanders are hierarchical such that, for example in FIG. 1, SAS Expander E's route table is a subset of SAS Expander D's route table, which in turn is a subset of SAS Expander B's route table. Thus, subtractive routing is used by downstream expanders (SAS Expander E) to forward a routing request to an upstream expander (SAS Expander D) that may have the capability to route the request. If the upstream expander (SAS Expander D) does not have the capability, it forwards the routing request upstream again via the subtractive port until the request can be routed to a device or the root expander (SAS Expander B) is reached since the root SAS Expander has all of the addresses in the SAS topology in its route table or directly attached to itself so that the request can be resolved, if possible. Otherwise, the request is rejected.

For SAS Expanders which communicate via subtractive routing, the SAS Expanders are typically considered as being upstream from each other and SAS Expanders which communicate via table routing are typically considered as being downstream from each other.

Figure 2A:
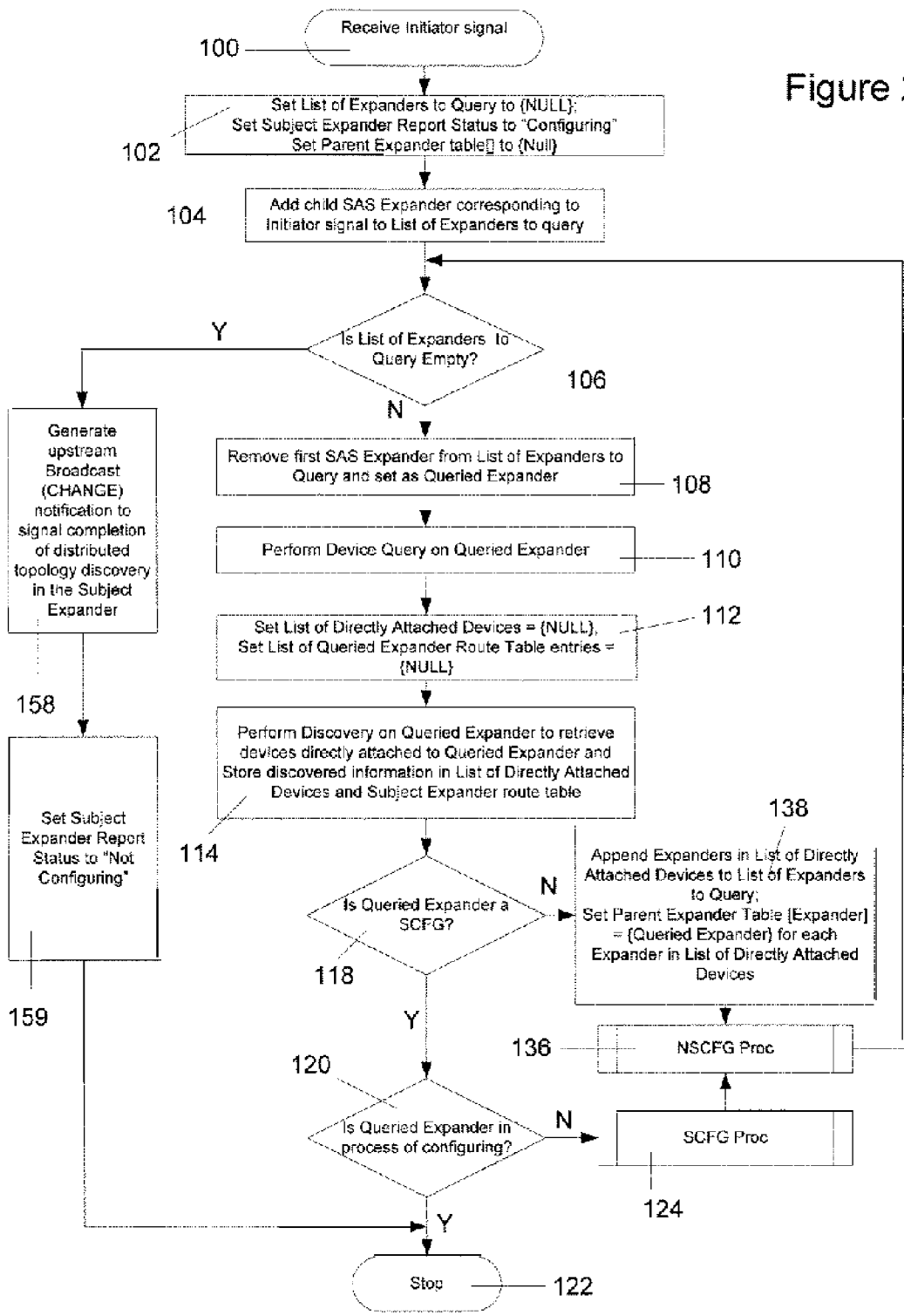
FIGS. 2*a* to 2*c* are flowcharts outlining a method of determining a distributed topology for a SAS Expander.
Figure 2B:
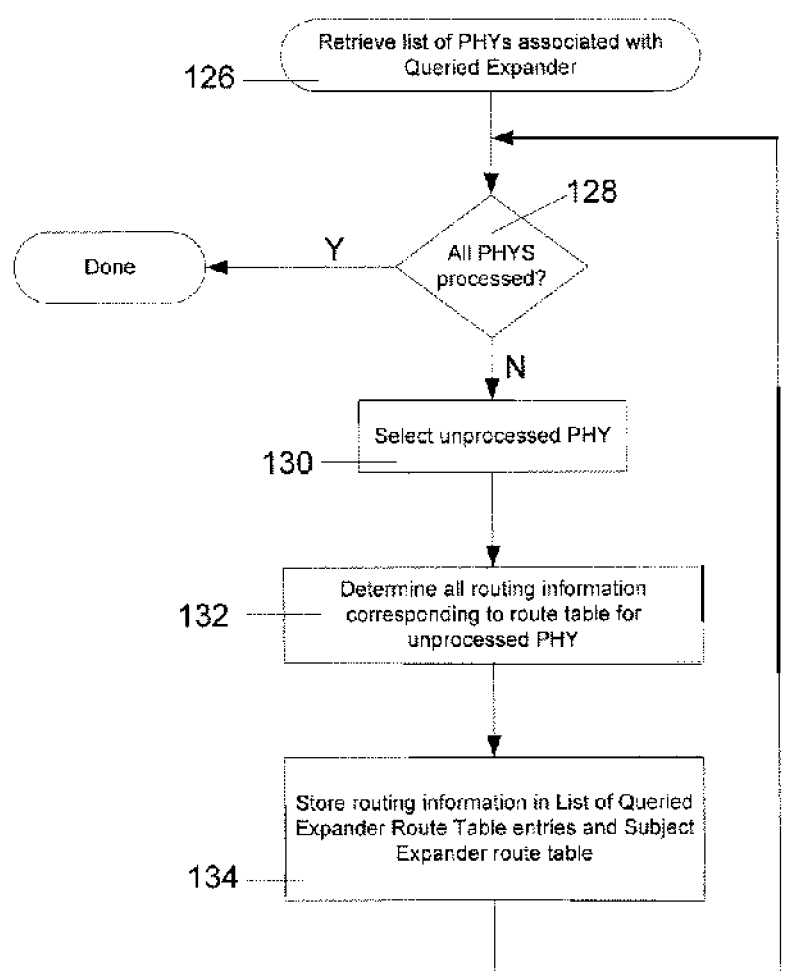
Figure 2C:
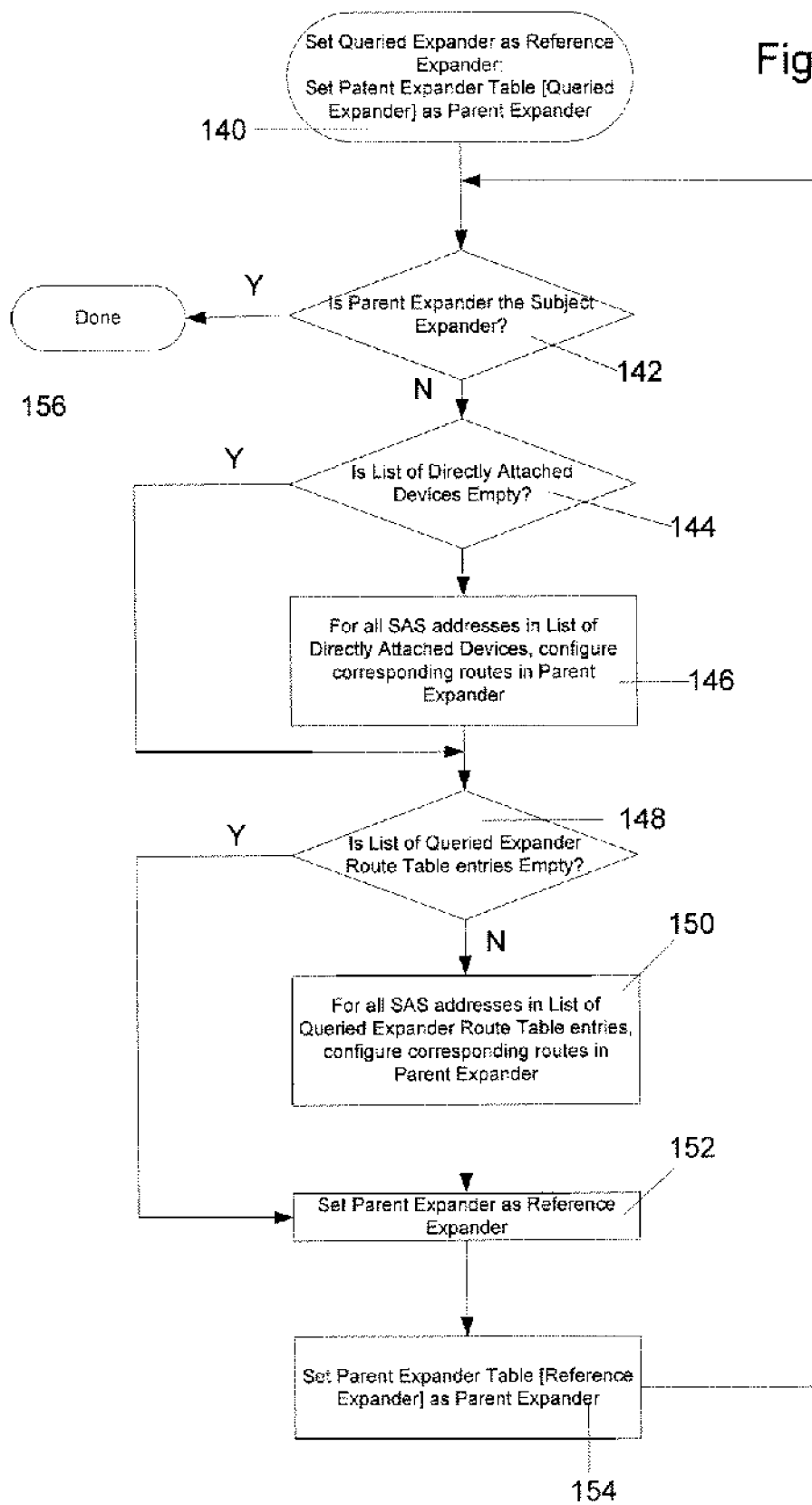

Turning to FIGS. 2a to 2c, a series of flowcharts outlining a method of distributed topology discovery is shown. As will be understood, information is passed from the bottom up while the discovery is performed top down.

The method is typically initiated when a SAS Expander receives an initiator signal (step 100). In the preferred embodiment, the initiator signal is typically delivered in one of two ways. The initiator signal may be received when a directly connected downstream SAS Expander completes a link initialization sequence with a PHY within the subject SAS Expander. Alternatively, the initiator signal may be received by a PHY in the subject SAS Expander in the form of a Broadcast (CHANGE) primitive, a Broadcast Frame, or a SMP Zoned Broadcast Message indicating that the topology of at least one downstream SAS Expander has been updated. It will be understood that other methods of transmitting the initiator signal to the subject SAS Expander to indicate an origin of topology change are possible.

After receiving the initiator signal, the subject SAS Expander sets an ordered List of Expanders to Query to {NULL}, sets a report status of the subject SAS Expander as "Configuring" and sets a Parent Expander Table [Expander] to {Null} (step 102). As will be described below, the Parent Expander Table is used to determine the parent of the corresponding "Expander" denoted in the square brackets. The child SAS Expander corresponding to the received initiator signal is then appended to the List of Expanders to Query (step 104). The child Expander is the SAS Expander which is connected to the PHY of the subject SAS Expander which received the initiator signal.

After adding the child SAS Expander to the List of Expander to query, a check is performed to determine whether or not the List of Expanders to Query is empty (step 106). The use of parent and child will be understood by one skilled in the art. The collection of Expanders in the List of expanders to Query provides a set of paths originating from the subject SAS expander based on an origin of topology change.

Figure 3:
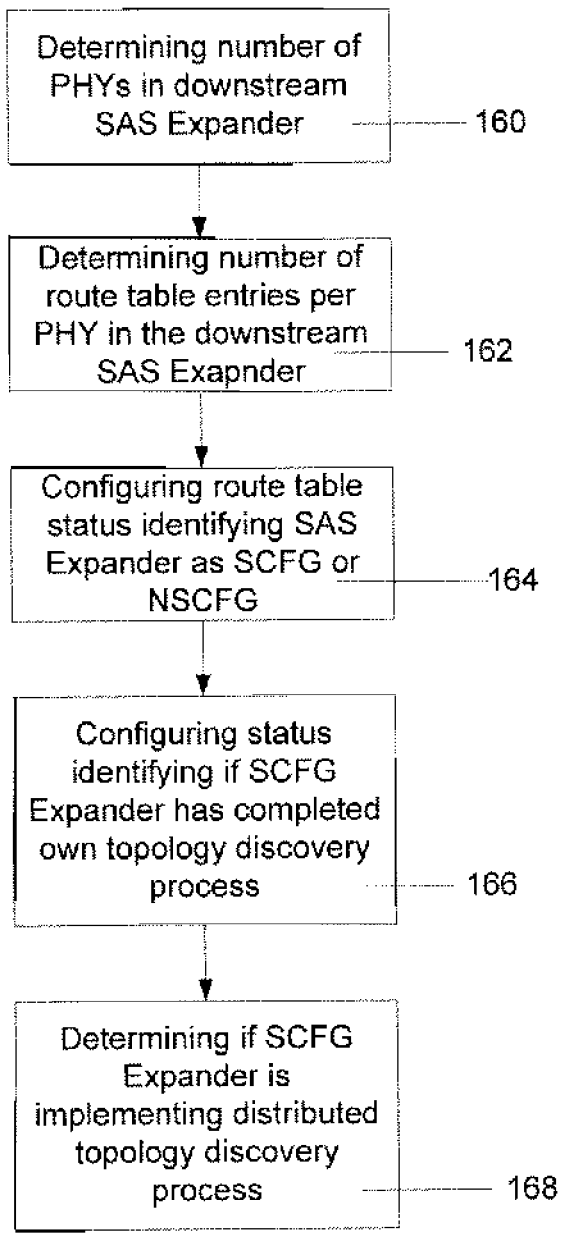
FIG. 3 is a flowchart showing a method of querying a SAS device.

If the list is not empty, the first SAS Expander in the List of Expanders to Query is removed and set as a Queried Expander (step 108). As disclosed above, the List of Expanders to Query is an ordered list so there is an order to the Expanders being queried. Since items are added to the List of Expanders to Query in a breadth first manner, the Expanders are thus queried, processed, and configured in a breadth first manner as required by the SAS standard An Expander Device Query is then performed on the Queried Expander (step 110). One exemplary method of querying the Queried SAS Expander is discussed with reference to FIG. 3 which is associated with a SMP Report General Command. Other methods of performing an Expander Device Query may also be performed. The subject SAS Expander queries the SAS Expander to determine the number of PHYs which are located within the Queried Expander (step 160), determine the number of route table entries per PHY in the Queried Expander (step 162), configure route table status determining if the Queried SAS Expander is a self-configuring (SCFG) Expander (step 164), determine if the Queried Expander has completed execution of its own topology discovery process (step 166) and determine if the Queried SAS Expander is implementing a distributed topology process (step 168). It will be understood that the subject SAS Expander may make further queries with respect to information concerning the Queried Expander. Furthermore, the order of steps 160 to 168 may vary.

After performing the query, a List of Directly Attached Devices and a List of Queried Expander Route Table entries are set to {NULL} (step 112). Direct routing information is then extracted from the Queried Expander to determine, or discover, the SAS addresses of all SAS storage network elements directly attached to the Queried Expander along with the device type, status, and other characteristics of those connected SAS storage network elements. This discovery information is then appended to the List of Directly Attached Devices, preferably in ascending order with respect to the PHYs to which the storage network elements are connected, and the subject SAS Expander route table (step 114). The discovery process is preferably performed via a SMP Discover command.

A check is then performed to determine whether the Queried Expander is a self-configuring (SCFG) SAS Expander (step 118). If it is a SCFG Expander, a check is performed to determine if the Queried Expander is in the process of configuring its route table (step 120). If it is, the distributed topology determination method is stopped and exited (step 122). However, if it is not, a self-configuring process is called and executed (step 124). An embodiment of this process is illustrated in FIG. 2b.

Firstly, a List of PHYs associated with the Queried Expander is retrieved (step 126). After retrieving this list, a check is performed to determined if all the PHYs have been processed to retrieve their routing table information (step 128). If all of the PHYs have not been processed, the next PHY, in ascending order, of the unprocessed PHYs is selected (step 130). In the preferred embodiment, only one PHY in each port of the Queried Expander is selected for processing. After being processed, the rest of the PHYs in the port are deemed processed. Furthermore, in an alternative embodiment, only those PHYs in the Queried Expander having directly attached Expanders are processed. In yet another embodiment, PHYs connected to upstream SAS storage network elements are not processed All of the routing information corresponding to the route table of the selected unprocessed PHY is then determined (step 132). If the Queried Expander has previously completed its own distributed topology determination, the Subject Expander can determine the routes of the Queried Expander in an optimized fashion. As the Subject SAS Expander retrieves the routing information from the Queried Expander, the Queried Expander can send a signal to the subject Expander indicating the last non-zero route in its route table for the PHY being processed. Thusly, the Subject Expander doesn't need to retrieve any more routes beyond the last non-zero route and can proceed to the next step. The routing information is stored in the List of Queried Expander Route Table entries and the subject Expander route table (step 134). Although described as two separate steps of storing, it will be understood that the routing information may be stored in a single location and simply indexed by the Expander route table and the List of Queried Expander Route Table entries. After the information is stored, the check to determine if all PHYs have been processed (step 128) is performed again. If all PHYs have been processed, the self-configuring process is completed and then excited.

After completion of the self-configuring process, a non self-configuring process is executed (step 136). An embodiment of this non self-configuring process is schematically shown in FIG. 2c and described below.

However, if the Queried Expander is not a SCFG Expander but a non-self-configuring (NSCFG) Expander, as determined at step 118, all of the SAS Expanders in the List of Directly Attached Devices is appended to the List of Expanders to Query (step 138). The Parent Expander Table for each of the Expanders is also set to the Queried Expander so that Parent Expander Table [Expander]={Queried Expander}. As discussed above, both of these lists are ordered so that the method is being performed in a breadth-first manner. It will be further understood that only SAS Expanders which are stored in the List of Directly Attached Devices are appended. Other SAS storage network elements are not appended.

After appending this information in step 138, the non self-configuring process (step 136) is called. In the non self-configuring process, the Queried Expander is initially set as a Reference Expander and the parent of the Queried Expander is initially set as a Parent Expander (step 140). The parent of the Queried Expander is determined by retrieving the information from Parent Expander Table [Queried Expander] ={address of a SAS storage network element}

A check is then performed to determine if the Parent Expander is the subject SAS Expander (step 142). If it is not, a check is performed to determine if the List of Directly Attached Devices is empty (step 144). If it is not empty, for all of the SAS addresses which are stored in the List of Directly Attached Devices, corresponding routes are configured in order in the Parent Expander (step 146). A check is then performed to determine if the List of Queried Expander Route Table entries is empty (step 148).

If the List of Directly Attached Devices is empty, the check to determine if the List of Queried Expander Route Table entries is empty is performed (step 148).

At step 148, if the List of Queried Expander Route Table entries is not empty, for all of the SAS addresses which are stored in the List of Queried Expander Route Table entries, corresponding routes are configured in order in the Parent Expander (step 150). The Parent Expander is then set as the Reference Expander (step 152) and the Parent of the new Reference Expander is set as the Parent Expander (step 154). As with step 140, the Parent Expander is determined by looking at the address stored in Parent Expander Table [Reference Expander]

If the List of Queried Expander Route Table entries is empty, as determined in step 148, the process proceeds to step 152.

After step 154, the process returns to check if the Parent Expander is the subject SAS Expander (step 142). If not, the process proceeds again to step 144, otherwise the process exits (step 156).

After exiting the non self-configuring process, a check is performed to determine if the List of Expanders to Query is empty (step 106). If not, the method proceeds again to step 108, otherwise, a message is transmitted to an upstream SAS Expander notifying that a downstream topology to the upstream SAS Expander has changed (step 158). The report status of the subject Expander is then set to "Not configuring" (step 159).

An advantage of the present invention is that the subject SAS Expander withholds any indication that its topology is changing until after the method is completed. However, after the message is transmitted, the subject SAS Expander operates with upstream SAS Expanders to provide routing table information so that the upstream SAS Expander may complete its distributed SAS topology determination.

Another advantage is that the discovery process is that there is no traversal of the topology downstream from a SCFG Expander which is encountered in any one of the paths determined in the List of Expanders to Query. In the preferred embodiment, if there are no SCFG Expanders in a path, the last Expander in the path also results in the discovery process being completed for that path.

Prior to providing more detailed examples of a method of distributed topology discovery in a homogeneous topology, where all SAS Expanders are SCFG, and in a heterogeneous topology where there is a mixture of SCFG and NSCFG SAS Expanders, an explanation of notation is provided.

Each SAS Expander is seen as a node and denoted $n_i$ while the distance between two SAS Expanders $n_i$ and $n_j$ is denoted by Distance $(n_i, n_j)$. A route for node $n_i$ may be denoted as $(n_{j,k}, p_j)$ where $n_j$ is the referenced node label (SAS address), k is the route index and $p_j$ is the port in $n_i$ associated with the route. The direct route table for the Expander may be represented by $Dn_i=\{(n_{j,0},p_0), (n_{k,1},p_1), \ldots, (n_{x,N-1}, p_{N-1})\}$ with all values of $p_j$ being unique while the route table is denoted as $Rn_i=\{(n_{j,0},p_0), (n_{k,1},p_1), \ldots, (n_{x,N-1}, p_{N-1})\}$ with all values of $p_j$ not necessarily having to be unique. The route parent table of an Expander is denoted as $RPn_i=\{n_{j,0}, p_0(n_{k,1},p_1), \ldots, (n_{k,N-1}, p_{N-1})\}$ with N entries.

The following description is an embodiment of steps 114 and 124 of FIG. 2a. For a homogeneous topology, after entering the SCFG process (step 124), the subject SAS Expander retrieves the List of PHYS associated with the Queried SCFG Expander (step 126). Since not all PHYs have been processed (step 128), one of the unprocessed PHYs is selected (step 130). The subject SAS Expander then accesses the Queried SCFG SAS Expander to retrieve routing information such as the direct route table ($Dn_{scfg}$) (from step 114) and the route table ($Rn_{scfg}$). After retrieving this information, the direct route table and the route table information is concatenated to form the portion of the route table corresponding to the triggered PHY ($p_{trig}$) on which the initiator signal was received of the subject SAS Expander ($Rn_{subject\_expander}, p_{trig}=Dn_{scfg} Rn_{scfg}$). The calculated route table value is then transposed into an updated route table ($Rn_{subject\_expander}, p_{trig}'$) by replacing a predetermined set of PHYs in each of the available routes. This updated route table is then appended to the original subject SAS Expander route table ($Rn_{subject\_expander}, p_{trig}'$ to $Rn_{subject\_expander}$) along with any necessary re-indexing along with re-indexing the route index from the route index frame of reference of the Queried Expander to the route index frame of reference of the Subject Expander (step 134). These steps are then repeated for each of the unprocessed PHYs until the SCFG process is exited.

Figure 4:
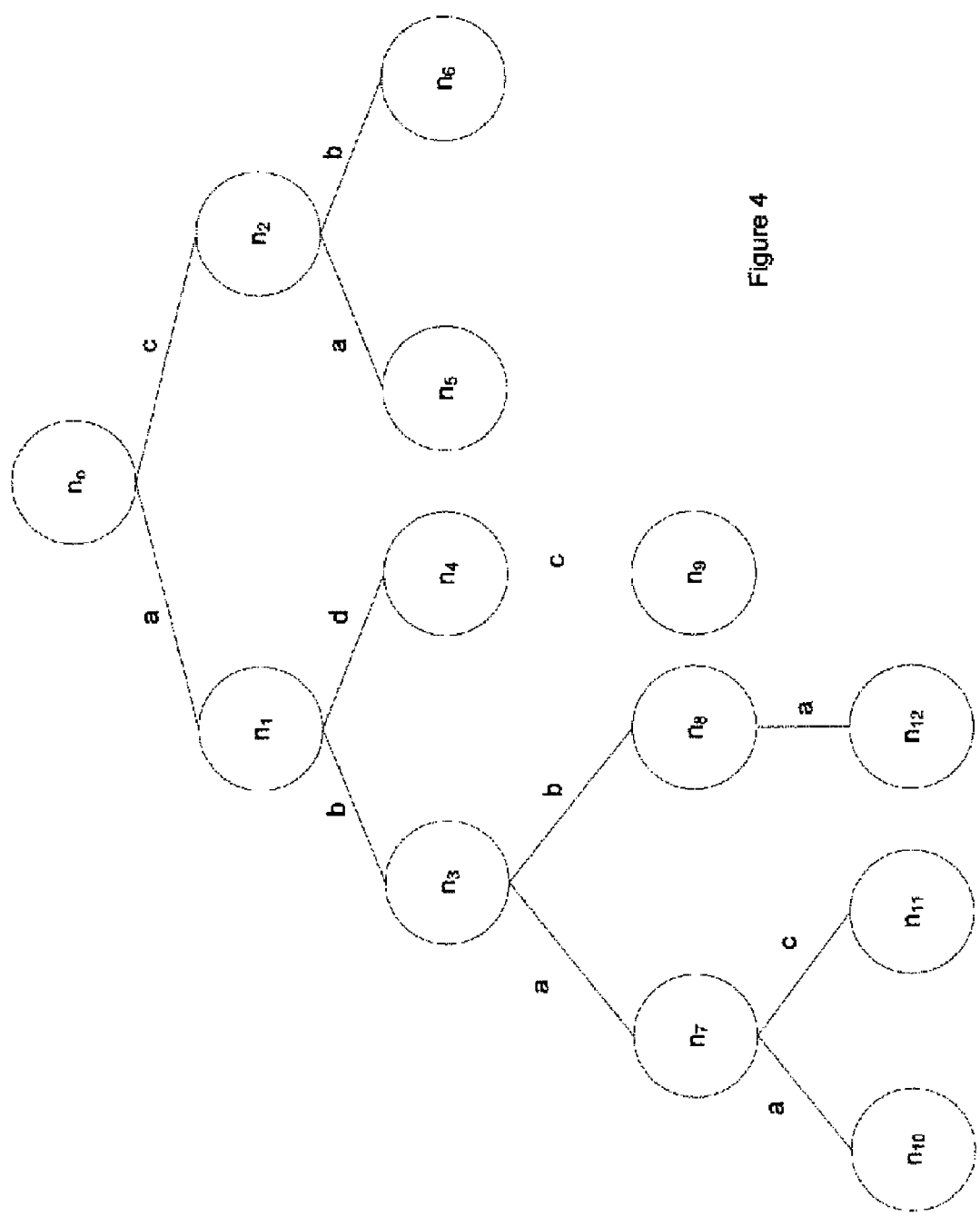
FIG. 4 is a schematic diagram of a heterogeneous SAS topology.

Turning to FIG. 4, a more detailed example of a method of distributed topology discovery is shown for a heterogeneous topology. Each of the SAS storage network elements in this example, other than the Subject SAS Expander, is described as being a node. In this example, it is assumed that each of the nodes is a NSCFG SAS Expander. The Subject SAS Expander, as previously detailed, is a SCFG SAS Expander. In this example, for simplicity, the subject SAS Expander ($n_{subject\_expander}$) is seen as $n_0$ while the triggered PHY (the subject SAS Expander PHY receiving the initiator signal) is denoted as $p_{trig}$. In order to update its route table, $n_0$ must traverse the entire tree subtended by $p_{trig}$ to update the corresponding route table $Rn_0$ and in particular, all of the routes in $R_{n0}$ corresponding to the PHY $p_{trig}$. As will be understood, each of the other SAS Expanders, $n_1$ to $n_{12}$, shown in FIG. 4, are downstream to the subject SAS Expander. The traversal described is a breadth first approach. Where possible, the steps listed correspond to FIGS. 2a to 2c.

Prior to receiving an initiator signal, $n_0$ has the following routing information $Dn_0=\{(n_{1,0}, a), \text{ and } (n_{2,1}, c)\}$, $Rn_0=\{\ \}$, $RPn_0=\{\ \}$. It is further assumed that $p_{trig}=a$. In this example, the subject SAS Expander $n_0$ can reach $n_1$ since $n_1$ is directly connected to the subject Expander and the path to node $n_1$ can be denoted as $Dn_0$.

After receiving the initiator signal (step 100), the subject SAS Expander sets a List of Expanders to Query to {NULL} (step 102) and then adds $n_1$ into the List of Expanders to Query since $n_1$ is the node attached to the PHY which received the initiator signal (a) (step 104).

A check is then performed to determine if the List of Expanders to Query is empty (step 106) (which it is not since it is populated with $n_1$). The node $n_1$ is then removed from the List of Expanders to Query and set as the Queried Expander (step 108). An Expander Device Query is then performed on the node $n_1$ (step 110).

After the query is completed, a List of Directly Attached Devices (LDAD) and a List of Queried Expander Route Table entries are both set to {Null} (step 112). A discovery is them performed on the Queried Expander ($n_1$) to retrieve devices which are directly attached $n_1$, typically seen as $Dn_1$, and then these devices are added to the List of Directly Attached Devices and the subject SAS Expander route table (step 114) so that the LDAD=$n_3$ and $n_4$. Since the Queried Expander is not a SCFG Expander (step 118), $n_3$ and $n_4$ are appended to the List of Expanders to Query (LEQ)=$\{n_3, n_4\}$ in that specific order (step 138). The NSCFG process is then called (step 136).

Node $n_1$ is then set as the Reference Expander and node $n_0$ is set as the Parent Expander (step 140). A check is then performed to determine if the Parent Expander is node $n_0$ (step 142) which it is and therefore the NSCFG process is exited (step 156).

Stated notationally, in one embodiment, $Dn_1=\{(n_{3,0}, b), (n_{4,1}, d)\}$. Subject Expander $n_0$ adds $Dn_1$ into $Rn_0$ by replacing the PHYs b and d with $p_{trig}=a$ (step 114). Furthermore, $RPn_0$ can be calculated from $Dn_1$ by replacing the nodes $n_3$ and $n_4$ with $n_1$ which also correspond with the insertion of information into the Expander table of the parent of the subject Expander. After performing all the necessary replacements, $Dn_0=\{(n_{1,0}, a), (n_{2,1}, c)\}$, $Rn_0=\{(n_{3,0}, a), (n_{4,1}, a)\}$, $RPn_0=\{(n_{1,0}, b), (n_{1,1}, d)\}$ (step 156).

After completing the query of node $n_1$, subject Expander $n_0$ verifies if the List of Expanders to Query is empty (step 106) but it is not so node $n_3$ is removed the List of Expanders to Query and set as the Queried Expander (step 108).

As can been seen in the updated direct route table and the route table, subject Expander $n_0$ has knowledge of SAS storage network elements $n_3$ and $n_4$. In order to reach $n_3$ and $n_4$, subject Expander $n_0$ has to traverse a path through $n_1$. Since node $n_1$ has knowledge of $n_3$ and $n_4$, since they are directly connected (as illustrated by $Dn_1$), access to these nodes may be provided to the subject Expander $n_0$ immediately.

For this reason, subject Expander $n_0$, can retrieve and populate $Rn_0$ and $RPn_0$ for $n_3$ and $n_4$ in a similar manner to above, from $Dn_3=(n_{7,0}, a), (n_{8,1}, b)$, and $Dn_4=(n_{9,0}, c)\}$. As will be understood, each of the SAS Expanders is queried individually. After this calculation, $Dn_0=\{(n_{1,0}, a), (n_{2,1}, c)\}$, $Rn_0=\{(n_{3,0}, a), (n_{4,1}, a), (n_{7,2}, a), (n_{8,3}, a), (n_{9,4}, a)\}$ and $RPn_0=\{(n_{1,0}, b), (n_{1,1}, d), (n_{3,2}, a), (n_{3,3}, b), (n_{4,4}, c)\}$.

After the queries of nodes $n_3$ and $n_4$ have been completed, the node $n_0$ checks to see if the List of Expanders to Query is empty 106. As will be understood the List of Expanders to Query is not populated with nodes $n_7$, $n_8$ and $n_9$. So each of these nodes are processed in accordance with the flowcharts of FIGS. 2a to 2c. From the previous route table information retrieved from nodes $n_3$ and $n_4$, the node $n_0$ has knowledge of nodes $n_7$, $n_8$, and $n_9$. In order to reach $n_7$, $n_8$, and $n_9$, the node $n_0$ traverses a path through node $n_1$. However, as can be seen from the figure, $n_1$ has no knowledge of those nodes. As such, $Rn_1$ must be configured with $n_7$, $n_8$, and $n_9$ by node $n_0$ since it is an intermediate SAS Expander between the node $n_0$ and the SAS Expander being queried, whether it's node $n_7$, $n_8$, or $n_9$.

In order to configure $Rn_1$, the subject Expander $n_0$ requires information concerning the branches of node $n_1$ that contain nodes $n_7$, $n_8$, and $n_9$. This information is retrieved by executing the NSCFG process (step 136). Since nodes $n_7$, and $n_8$, were discovered by processing their parent, $n_3$, the branch of $n_1$ that contains $n_7$ and $n_8$ is available at the $RPn_0$ entry that has the same route index as the $Rn_0$ that contains $n_3$. More specifically, the branch of $n_1$ that contains $n_7$ and $n_8$ is b. Similarly, the branch of $n_1$ that contains $n_9$ is determined as d.

The route table for $Rn_1$ may then be calculated as $Rn_1=\{(n_{7,0}, b), (n_{8,1}, b), (n_{9,2}, d)\}$. Similarly, once the subject Expander has knowledge of nodes $n_{10}$, $n_{11}$, and $n_{12}$, both nodes $n_1$ and $n_3$ must have their route tables $Rn_1$ and $Rn_3$ configured appropriately to reflect this updated information.

When the route tables in nodes $n_1$ and $n_2$ are configured as outlined in FIG. 2c, subject Expander $n_0$ must specify the index and branch path for each particular route as it is added. The branch path is immediately available from $RPn_i$. Since the nodes in the subtree are added to the route tables $Rn_1$ and $Rn_2$ in a breadth first manner, the route index of a given node can be readily determined by performing a breadth first traversal of the subtree rooted at the node to be configured (e.g. $n_1$).

Finally, to determine the route index for the node to be added in any Reference Expander route table, the Subject Expander node $n_0$ counts the number of nodes having a distance two or greater between node $n_0$ and the node to be added (e.g. $n_{10}$) until the node is encountered in the traversal. The count is then the route index for the node. After querying all the Expanders to be queried, an upstream broadcast (CHANGE) notification is transmitted indicating that a change has occurred downstream.

In yet a further embodiment, the subject SAS Expander traverses other SAS Expanders which are not necessarily downstream from the subject SAS Expander.

In an alternative embodiment, when the method of distributed topology discovery is implemented in self-configuring (SCFG) SAS Expanders, each self-configuring SAS Expander uses SMP commands to determine the SAS addresses of devices directly attached to any neighbouring downstream SAS Expanders; each self-configuring expander uses SMP commands to copy the contents of the route tables of any neighbouring downstream expanders; each self-configuring expander must process and configure the route tables of any and all non-self configuring expanders between itself and downstream self-configuring expanders and each self-configuring expander must update its route table and that of any non-self configuring expander in a coherent method to minimize disruption of connection traffic routing.

In the preceding description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. In a Serial Attached Small Computer System Interface (SAS) domain including a set of SAS storage network elements, a method of configuring an Expander route table of a SAS Expander in a distributed manner comprising:
   receiving notification of a trigger event by an initiator at SAS Expander closest to the initiator;
   determining a set of paths originating from said SAS Expander based on an origin of topology change;
   determining a list of Expanders to query based on said set of paths;
   said list of Expanders to query including a first encountered self-configuring or last-in-path Expander and intermediate non self-configuring SAS Expanders for each path;
   wherein determining comprises calling a self-configuring process;
   determining a set of route table information from a set of SAS Expanders in said list of Expanders to query;
   updating route tables of the intermediate non self-configuring (NSCFG) SAS Expanders in a distributed manner;
   wherein said updating comprises calling a non-self-configuring process; and
   configuring said Expander route table based on said set of route table information;
   wherein the determining, updating and configuring are performed in an iterative sequence originating from the initiator.

2. The method of claim 1 wherein each of said paths begins at said SAS Expander and terminates at said origin of topology change.

3. The method of claim 1 wherein said path is empty when said origin of topology change is upstream from said SAS Expander.

4. The method of claim 1 wherein said list of Expanders to query is an ordered list.

5. The method of claim 1 wherein said set of Expanders are downstream from said SAS Expander.

6. The method of claim 1 further comprising, occurring before said step of determining a set of paths: receiving a signal indicating a topology change to said SAS domain.

7. The method of claim 6 wherein said step of receiving comprises:
   receiving notification that a SAS storage network element has completed a link initialization sequence with said SAS Expander, or a link has dropped out of an operational state.

8. The method of claim 6 wherein said step of receiving comprises:
   receiving a broadcast change primitive, a broadcast frame or a SMP Zoned Broadcast message indicating a change to one of said SAS storage network elements.

9. The method of claim 8 wherein said one of said SAS storage network elements is downstream from said SAS Expander.

10. The method of claim 6 further comprising, occurring after said step of receiving said signal:
    determining said origin of said topology change by determining a trigger PHY.

11. The method of claim 1 further comprising: generating a signal for an upstream SAS storage network element indicating a change to its downstream topology.

12. The method of claim 1 wherein said step of determining comprises: querying each self-configuring SAS Expander in said list of Expanders to query to retrieve its route table; querying each SAS Expander in said list of Expanders to query to retrieve its direct routing table; and querying each SAS Expander in said list of Expanders to retrieve local PHY status information and identification of directly attached devices.

13. The method of claim 1 further comprising: providing said configured Expander route table to an upstream SAS Expander.

14. The method of claim 13 wherein said step of providing is performed after said Expander route table is completely configured.

15. The method of claim 1 wherein said step of updating is performed in a breadth-first or depth-first traversal order.

16. The method of claim 1 wherein said self-configuring process comprises: retrieving a list of PHYs associated with an Expander being queried; retrieving all routing information from the Expander being queried a route table of each of said PHYs in said list of PHYs; and storing said routing information as said set of route table information in the SAS expander.

17. The method of claim 1 wherein said self-configuring process comprises: selecting one PHY per port of said Expander being queried; determining all routing information corresponding to a route table of each of said one PHY per port; and storing said routing information as said set of route table information.

18. The method of claim 1 wherein said non self-configuring process comprises: determining a list of SAS storage network elements directly attached to said Expander being queried; and configuring routes of a parent SAS Expander to said Expander being queried based on said SAS storage network elements directly attached to said Expander being queried.

19. The method of claim 18 wherein said step of determining a list of SAS storage network elements comprises:
    retrieving a direct routing table from said Expander being queried; and
    retrieving a route table from said Expander being queried when said Expander being queried is a self-configuring Expander.

20. The method of claim 1 further comprising, occurring before said step of determining a set of route table information: determining if a SAS Expander being queried is a self-configuring or non-self-configuring SAS Expander.

21. In a Serial Attached Small Computer System Interface (SAS) domain including a set of SAS Expanders, a method of configuring an Expander route table of a subject SAS Expander in a distributed manner comprising the steps of:
a) receiving an indication of a topology change due to a trigger event by an initiator to said SAS domain downstream from said subject SAS Expander, the subject SAS Expander being closest to the initiator;
b) determining a set of paths originating from said SAS Expander based on an origin of topology change;
c) determining a list of Expanders to query based on said set of paths; said list of Expanders to query including a first encountered self-configuring or last-in-path Expander and intermediate non self-configuring SAS Expanders for each path;
wherein determining comprises calling a self-configuring process;
d) determining a set of route table information from a set of SAS Expanders in a list of Expanders to query;
e) updating route tables of intermediate non self-configuring (NSCFG) SAS Expanders;
wherein said updating comprises calling a non-self-configuring process;
f) configuring a route table of said subject SAS Expander, in the distributed manner, based on information retrieved from a predetermined set of downstream SAS Expanders;
g) transmitting a signal to an upstream SAS Expander, upon completion of said route table configuration, indicating a topology change to said SAS domain downstream from said upstream SAS Expander;
h) activating said upstream SAS Expander as said subject SAS Expander; and
repeating these steps a) to h) for each upstream SAS Expander until a root SAS Expander is encountered.

22. The method of claim 21 further comprising:
providing said configured route table in response to a request from an upstream SAS Expander.

23. The method of claim 21 wherein said step of transmitting further comprises:
propagating said topology change indication to all PHYs in said subject SAS Expander except a PHYs belonging to the trigger port if said indication is received from an upstream SAS Expander; and
propagating said topology change indication to all PHYs in said subject SAS Expander after completing said step of configuring said route table if said indication is received from a downstream SAS Expander.

24. The method of claim 21 wherein said step of receiving comprises:
receiving notification that a SAS Expander has completed a link initialization sequence with said subject SAS Expander, or a link has dropped out of operational state.

25. The method of claim 21 wherein said step of receiving comprises:
receiving a broadcast change primitive, a broadcast frame or a SMP Zoned Broadcast message indicating a change to one of said SAS Expanders.

26. The method of claim 25 further comprising:
ignoring said broadcast change primitive, broadcast frame or Broadcast message if said primitive, frame or message is received from an upstream SAS Expander.

27. A non-transitory computer readable medium containing computer instructions which, when executed, perform, in a Serial Attached Small Computer System Interface (SAS) domain including a set of SAS storage network elements, a method of configuring an Expander route table of a SAS Expander in a distributed manner, comprising:
instructions for receiving notification of a trigger event by an initiator at SAS Expander closest to the initiator;
instructions for determining a set of paths originating from said SAS Expander based on an origin of topology change;
instructions for determining a list of Expanders to query based on said set of paths;
said list of Expanders to query including a first encountered self-configuring or last-in-path Expander and intermediate non self-configuring SAS Expanders for each path;
wherein determining comprises calling a self-configuring process;
instructions for determining a set of route table information from a list of Expanders to query;
instructions for updating route tables of the intermediate non self-configuring (NSCFG) SAS Expanders in the distributed manner;
wherein said updating comprises calling a non-self-configuring process; and
instructions for configuring said Expander route table based on said set of route table information;
wherein the instructions for determining, updating and configuring are performed in an iterative sequence originating from the initiator.

28. Apparatus for determining a distributed Serial Attached Small computer system interface (SAS) topology for a SAS Expander comprising:
at least one PHY, each PHY including a transmitter for requesting route table information from a list of Expanders to query downstream from said SAS Expander; and
a receiver for receiving route table information as a result of said requests and for receiving a topology change request from a trigger event by an initiator; and
a processor for:
determining a set of paths originating from said SAS Expander based on an origin of topology change;
determining a list of Expanders to query based on said set of paths;
said list of Expanders to query including a first encountered self-configuring or last-in-path Expander and intermediate non-self-configuring SAS Expanders for each path;
wherein determining comprises calling a self-configuring process;
determining a set of route table information from a set of SAS Expanders in a list of Expanders to query;
updating route tables of the intermediate non self-configuring (NSCFG) SAS Expanders in the distributed manner;
wherein said updating comprises calling a non-self-configuring process; and
configuring said Expander route table based on said set of route table information £ wherein the determining, updating and configuring are performed in an iterative sequence originating from the initiator.

29. The apparatus of claim 28 wherein said transmitter also includes means to transmit a signal to an upstream SAS Expander indicating a change in downstream topology after said Expander route table has been completely configured.

30. The apparatus of claim 28 wherein each of said receivers is capable of receiving a signal indicating an origin of topology change.

31. The apparatus of claim 30 further comprising a means to determine which of said at least one PHY receives said signal.

32. The apparatus of claim 28 wherein said list of Expanders to query comprises self-configuring Expanders.

33. The apparatus of claim 28 wherein said list of Expanders to query comprises non self configuring Expanders.

\* \* \* \* \*